United States Patent [19]

Sievers et al.

[11] Patent Number: 4,670,705

[45] Date of Patent: Jun. 2, 1987

[54] ALTERNATOR REGULATOR PROTECTION CIRCUIT

[75] Inventors: Kirk A. Sievers, Roselle; Arthur J. Edwards, Hoffman Estates, both of Ill.

[73] Assignee: Motorola, Inc., Schaumburg, Ill.

[21] Appl. No.: 695,315

[22] Filed: Jan. 28, 1985

[51] Int. Cl.[4] .......................... H02J 7/14; H02H 7/06
[52] U.S. Cl. ...................................... 322/28; 322/99; 320/64; 361/20
[58] Field of Search ....................... 322/28, 94, 73, 99; 320/61, 64; 328/112; 361/20, 21, 18

[56] References Cited

U.S. PATENT DOCUMENTS

| 4,233,525 | 11/1980 | Takahashi et al. | 328/112 X |
| 4,268,787 | 5/1981 | Sloan | 322/94 X |
| 4,308,492 | 12/1981 | Mori et al. | 320/32 |
| 4,322,630 | 3/1982 | Mezera et al. | 307/87 X |
| 4,368,417 | 1/1983 | Matsuyama | 322/29 |
| 4,471,235 | 9/1984 | Sakhuja et al. | 328/112 X |
| 4,477,766 | 10/1984 | Akita et al. | 322/28 |
| 4,536,697 | 8/1985 | Johnston et al. | 320/61 X |
| 4,543,521 | 9/1985 | Morishita et al. | 320/64 |

Primary Examiner—R. J. Hickey
Attorney, Agent, or Firm—Margaret Marsh Parker

[57] ABSTRACT

The circuit utilizes combinational logic and latching circuits to prevent damage to the regulator or to the battery of an automotive ignition system due to a serious fault such as the ignition being turned "on" but the engine/alternator not rotating. A fixed duty cycle control signal is added to the control signal for the field excitation current only when a serious fault is detected, thus limiting battery drain and excessive temperature in the regulator module but not shutting the whole system down. The system thus provides the desirable "limp-home" capability.

8 Claims, 3 Drawing Figures

ALTERNATOR REGULATOR PROTECTION CIRCUIT

BACKGROUND OF THE INVENTION

This invention relates to the field of alternator regulators and, more particularly, to a circuit for protecting the regulator in a vehicular alternator system.

In certain automobile ignition systems, the field obtains excitation current directly from the battery, which gives extremely good cut-in characteristics, but with a disadvantage—there is no element in the circuit which provides protection for the battery and the regulator. Therefore, if the ignition is switched on but the engine is not started, a heavy load will be put on the battery, and the regulator is quite likely to overheat since little or no cooling is provided under these "non-rotation" circumstances. It is normal for a switched excitation type of automotive voltage regulator to go to a 100% duty cycle operation when the input voltage drops slightly below the regulated voltage. However, since the field would have full excitation current of several amperes, it is possible to dissipate as much as 9 W in the regulator module and have a temperature rise of over 90°0 C. Since the ambient temperature in the automotive environment may be as much as 120° C., this means that the junction temperature of the Darlington drive transistor could be as much as 210° C.

It is desirable to achieve protection against such an eventuality by adding a minimum of extra elements and it is possible to accomplish this by incorporating the present invention into a system which provides an indication of a number of possible alternator system faults. Such a system is disclosed in a co-pending application (Ser. No. 687,603), assigned to the assignee of the present invention, and it has, not only reliability, but essentially error-free operation. That is, temporary conditions which are not due to a fault requiring service are ignored, and the transient pulses which are normal to automobile ignition systems cannot cause false indications. The three main fault conditions which are detected and indicated are "non-rotation of the alternator", "overvoltage" and "undervoltage". For any of these three types of fault, a lamp will be lit with a single accompanying legend such as "CHECK ENGINE". When detecting an overvoltage condition, it is also important to distinguish between a transient overvoltage condition due, for example, to an abrupt drop in the load with a fully charged battery, and a true overvoltage condition due to an actual fault in the system such as a short-to-ground in the field coil.

When detecting an "undervoltage" condition, it is necessary to distinguish between a temporary low voltage, such as would occur when the load on the system exceeds the generating capacity and pulls the battery voltage down, and an actual fault such as a broken wire between the alternator and the battery.

SUMMARY

It is, therefore, an object of this invention to provide protection for an alternator regulator against overheating when the ignition is "on" but the automobile engine is not running.

It is a particular object to provide such circuitry utilizing an existing fault detection circuit and its output signals.

It is yet another object to provide such a circuit which will also protect the automobile battery from unnecessary drain.

It is still another object to provide such circuitry with minimum expense and complexity, preferably with all or most of the elements contained in one integrated circuit.

These objects and others which will become apparent are obtained in a circuit which utilizes combinational logic circuits and latching circuits and which is synchronously clocked with the regulating period of a fixed frequency regulator. The duty cycle of the regulator is controlled to the desired maximum under "non-rotation" conditions, the duty cycle control signal is combined with two fault detect signals to ensure correct operation under all conditions since only if the engine is not rotating or if some other serious fault exists would it be desirable or necessary to limit the regulator duty cycle so severely.

False indications of "undervoltage" or "overvoltage" are prevented by, in each case, detecting two different status signals at the same time. No "fault" indication will be enabled unless both signals indicate that a true fault is present. In the case of "non-rotation", "fault" detection is obtained by the use of an AC signal from the alternator winding.

DETAILED DESCRIPTION OF A PREFERRED EMBODIMENT

Figure 1:
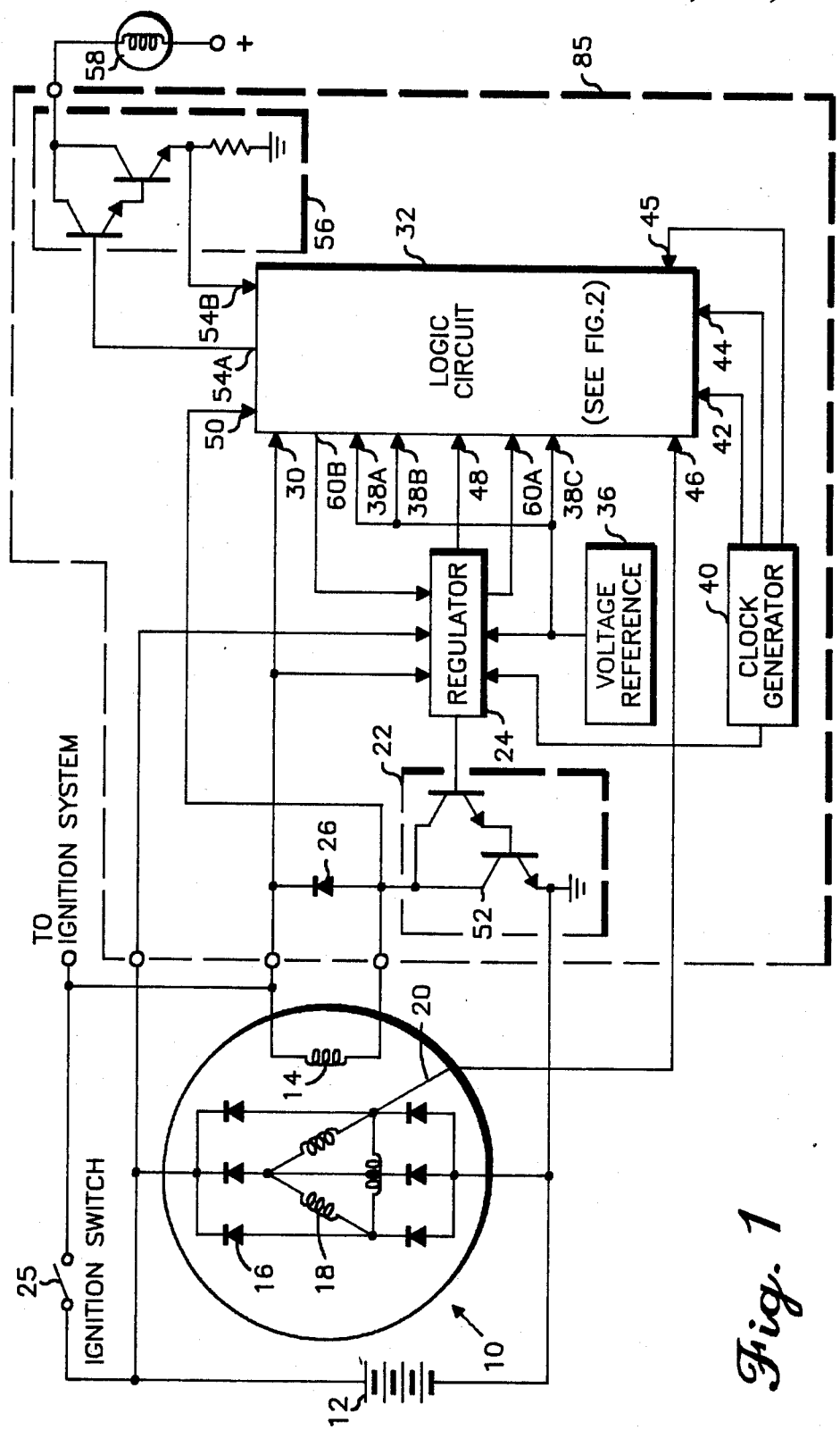
FIG. 1 is a diagram of an alternator system embodying the present invention.

In the diagram of FIG. 1 an alternator system is shown, including an alternator 10, battery 12, field coil 14 and rectifiers 16. The alternator 10 is shown here with a delta-connected winding 18, but this is not necessary for the invention. A tap 20 is connected to one corner of the delta winding 18 and provides an AC output signal which will be discussed later. A Darlington circuit 22 is the drive circuit for the field coil 14 and is controlled by the output of a regulator circuit 24. The specific design of the regulator 24 is not particularly relevant to this invention. An ignition switch 25 may be connected to couple the alternator/battery output to the rest of the vehicle's ignition system (not shown).

The field coil 14 and its associated diode rectifier 26 are coupled to the regulator circuit 24 and to an "undervoltage" input terminal 30 of a logic circuit 32. The logic circuit is shown in and explained with respect to FIG. 2. Another input to the regulator circuit 24 comes from a point 34 on the alternator 10. The signal at this point is sometimes termed the alternator "sense" signal and is a composite of the rectifier 16 output and the battery 12 voltage. A voltage reference source 36 is coupled to the regulator circuit 24 and to three inputs 38A, 38B and 38C of the logic circuit 32. A clock generator 40 is coupled to the regulator 24 and to two inputs 42,44 of the logic circuit 32. Another input 45 also comes from the clock generator 40 as will be explained with respect to FIG. 2. The tap 20 on the alternator winding 18 is coupled to an input 46 of the logic circuit. An output from the regulator 24 is coupled to an "overvoltage" input 48 of the logic circuit 32. Another input 50 to the logic circuit 32 comes from a terminal 52 on the collector of the Darlington circuit 22. Terminals 54A, 54B from the logic circuit 32 are connected to a second Darlington circuit 56 which controls an indicator 58, typically a lamp. A control signal from the regulator 24 is coupled to a terminal 60A of the logic circuit 32. In the logic circuit 32 that control signal may be altered to protect the regulator 24 before being coupled, via a terminal 60B, back to the regulator.

Figure 2:
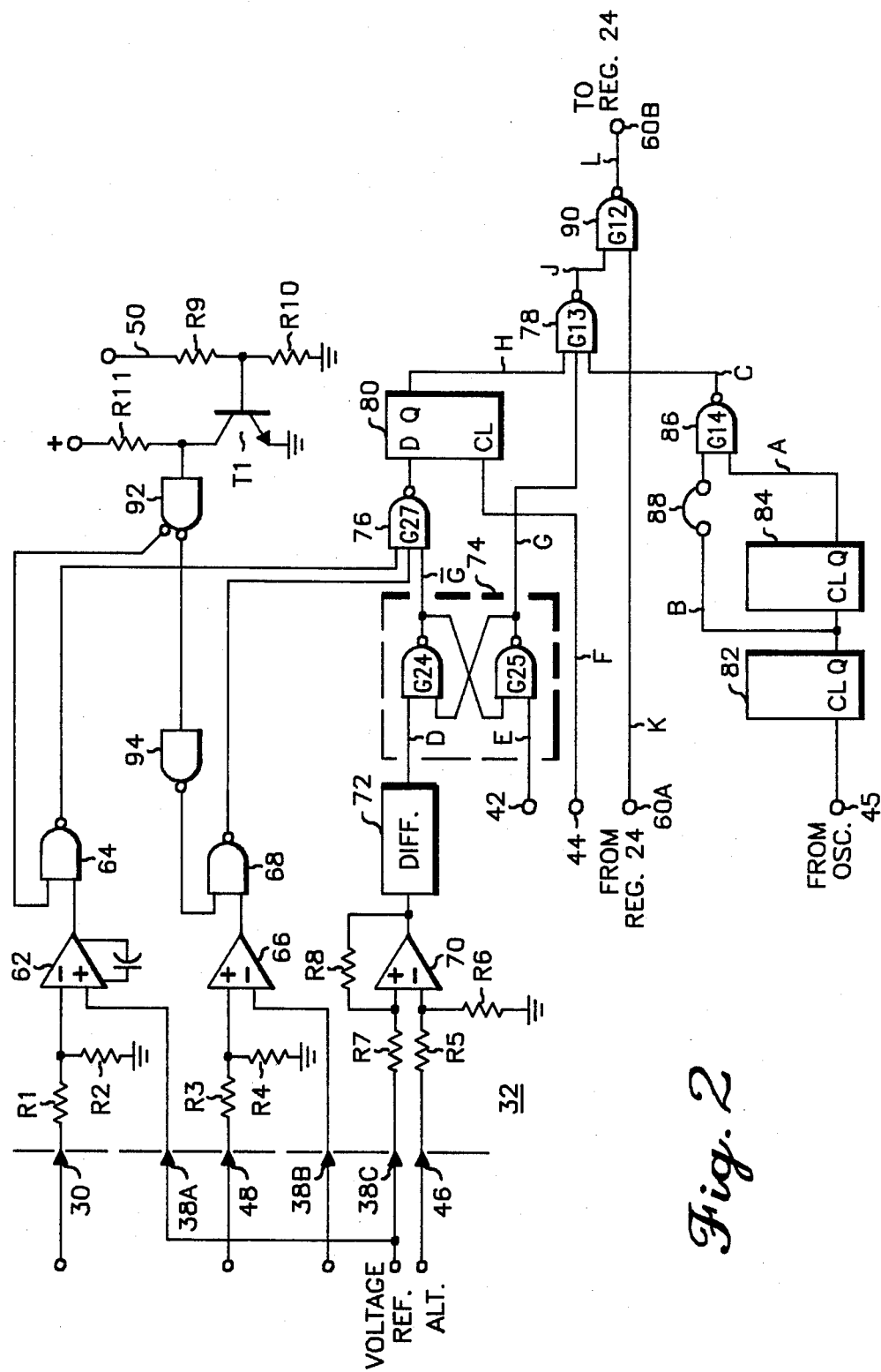
FIG. 2 is a diagram of the circuit of the invention.

In FIG. 2, a portion of the logic circuit 32 is shown with the various input and output terminals numbered as in FIG. 1. Reference letters in FIG. 2 refer to the timing diagram of FIG. 3. The "undervoltage" input terminal 30 is coupled through a resistor network R1, R2 to an "undervoltage" comparator 62. A second input to the comparator 62 comes from the reference terminal 38A, and the output of the comparator is coupled to a NAND gate 64. The "overvoltage" terminal 48 is coupled through a network R3, R4 to an "overvoltage" comparator 66. A second input to the comparator 66 comes from the reference terminal 38B, and the output of the comparator is coupled to a NAND gate 68. The tap 20 on the winding 18 is coupled to an input 46 of the logic circuit 32. Terminal 46 is coupled through a resistor network R5,R6 to a "rotation" comparator 70. A second input to the comparator comes from the reference terminal 38C, and the comparator output is coupled to a differentiator 72. The differentiator not only provides AC coupling, eliminating the possibility of error due to rectifier leakage, but also serves as a frequency doubler. The output signal "D" of the differentiator 72 is coupled to the "reset" input of a flip-flop 74, and the terminal 42 feeds a clock pulse "E" to the "set" input during each regulation period. The flip-flop 74 output "not-G" is coupled to one input of a NAND gate 76. Second and third inputs to the NAND 76 come from the NAND gates 64 and 68, respectively. The "G" output of the flip-flop 74 is coupled to a NAND 78. The NAND 76 output is coupled to the "Data" input of a D-type latch 80, and the Clock input comes from the clock generator terminal 44. The Q terminal output "H" of the latch 80 is coupled to another input of the NAND 78. A terminal 45 from the clock generator 40 couples the clock signal through two additional flip flops 82,84, the outputs "A", "B" of which are coupled to a NAND 86. The flip-flops 82,84 may be a part of the clock generator 40. Since each of the clock outputs "A" and "B" would provide effectively 50% duty cycles, the NANDed combination will provide a 25% duty cycle signal "C". A link 88 is shown with flip-flop 82 to allow a change from 25% to 50% if desired. The signal "C" is coupled to a third input of the NAND 78, and the NAND 78 output is coupled to one input of a NAND 90. The terminal 60A couples the signal which controls the Darlington drive circuit 22 to the NAND 90 where it is NANDed with the signal "J" from NAND 78. The NAND 90 output is then coupled back to a terminal 60B of the circuit 24.

The logic circuit input terminal 50, which comes from the collector terminal 52 of the Darlington circuit 22, is coupled through a resistor network R9,R10 to the base of a transistor T1, the collector of which is coupled to a NAND gate 92. The output of the NAND 92 is coupled to a second input of the NAND 64 and to a NAND gate 94, the output of which is coupled to a second input of the NAND 68.

Figure 3:
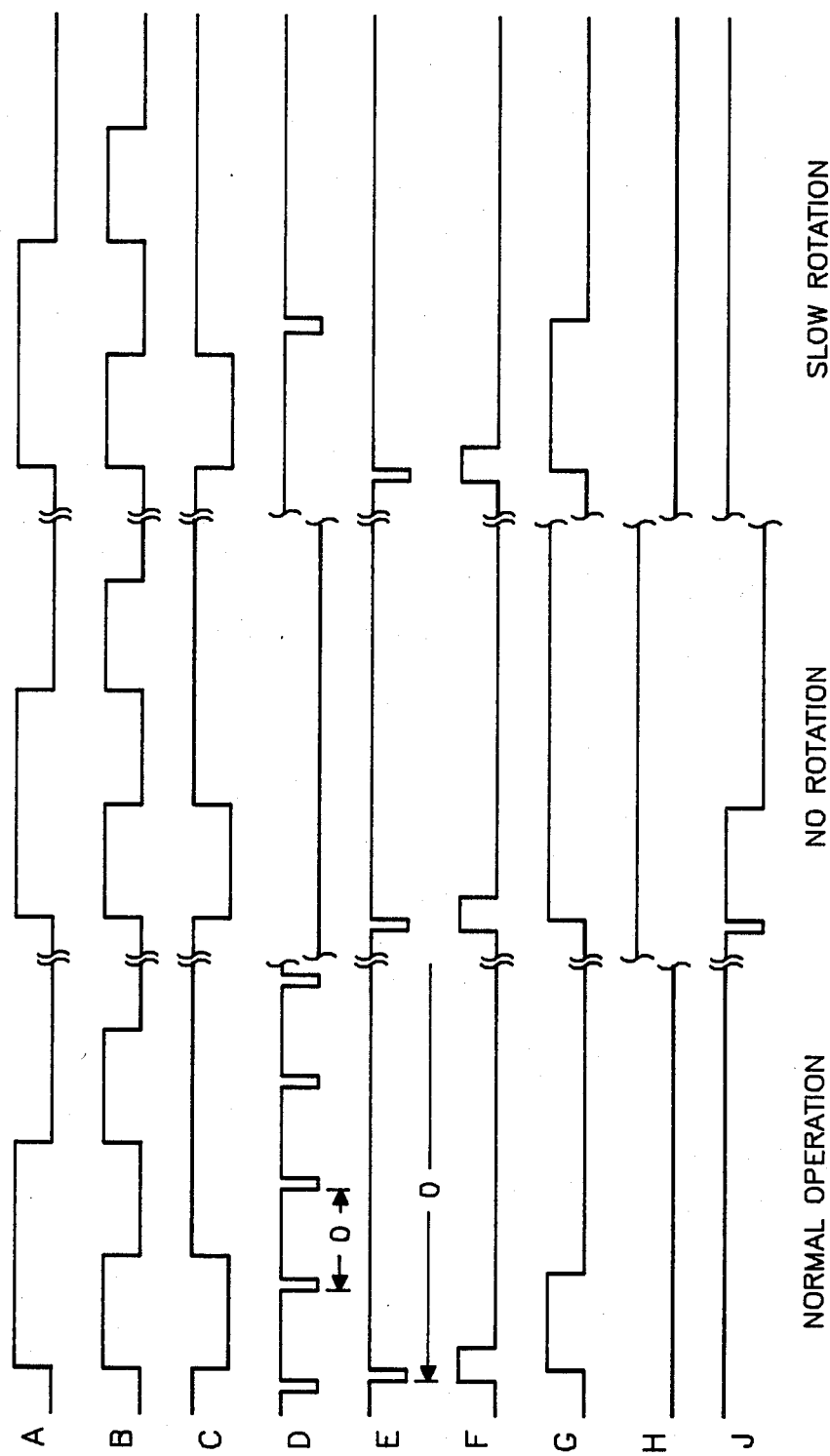
FIG. 3 is a timing diagram of the main signals of the circuit of FIG. 2.

The operation of the logic circuit 32 will be explained in connection with the timing diagram of FIG. 3. FIG. 3 is in three parts, the first illustrating normal operation of the regulation circuit; the second, the true "fault" condition—ignition on, no rotation; and the third, the false fault condition of slow rotation.

The general operation of the circuit will be explained first. In the circuit of FIG. 1, a signal comes from the alternator winding 18 by way of a tap 20 to the input terminal 46. This signal will be something between a relatively pure sine wave and a very clipped 50% duty cycle square wave. The minimum duty cycle is never zero, even with maximum regulation. In order to avoid problems with DC voltage due to rectifier leakage, this signal is coupled through the comparator 70 which also has hysteresis for noise suppression. The output of the comparator 70 is coupled through the differentiator 72 which is made up of $I^2L$ logic gates and which provides an output pulse for each transition as seen in signal "D". This doubling of the frequency is not necessary to operation of the invention but may, in some applications, be needed in order to prevent falsing. This would happen when the frequencies of the regulator and the alternator output were such that no pulse from the differentiator arrived during one regulated period.

Whenever there is at least one pulse "D" during the regulated period, the flip flop 74 will be set, then reset by the subsequent pulse "E". The output "not-G" of the flip flop 74 is then combined in NAND 76 with the signals from NAND's 68,64. Thus, any "fault", whether non-rotation, over-voltage or under-voltage, will be reflected in the signal at the "Data" input of the D-type latch 80. When a true fault exists in the system; i.e., a fault requiring almost immediate repair, it would not be desirable to have a 50% duty cycle regulator. When clocked by the next pulse "F" from terminal 44, the flip flop 80 output "H" is coupled to the NAND 78, NAND 90 and thence to the regulator 24.

When the signal from the alternator goes low and stays low, the output of the comparator 70 goes high and the differentiated signal goes high. With no pulse from the differentiator 72 to set the flip flop 74, a true non-rotation condition is indicated.

In the case of a transient overvoltage condition, when the signal coming from the regulator output terminal 48 into the comparator 66 is higher than the threshold point of the reference voltage on terminal 38B, the output of the comparator goes high. When that signal is NANDed in NAND 68 with the signal from NAND 94 in the NAND 68, the result is a signal indicating "no fault".

When a true overvoltage fault exists, the resultant signal from the NAND 68 goes low and stays low. When that signal is coupled through NAND 76 to the data input of the flip flop 80, the flip flop output signal "H" goes high at the next clock pulse "G", accurately indicating a fault.

Returning to the signal at the terminal 50 and the circuit including NAND gates 92, 94, and transistor T1, the signal received is representative of the status of the Darlington driver circuit 22. Since, in each of the true overvoltage conditions, the Darlington collector voltage will be continuously low, the voltage at the terminal 50 will be low. In the event of a transient overvoltage, the Darlington collector voltage will be high since the circuit will be off at the end of the regulate period. This is proper because the regulator will be working correctly to reduce the output voltage.

With respect to "undervoltage" conditions, if the regulator output voltage drops below the reference voltage at the comparator 62 input, the comparator output signal would go high. When that signal is NANDed with the signal from NAND 92 in NAND 64, the resultant output signal indicates whether or not a fault exists, since the signal from NAND 92 stays low in the case of a transient overvoltage, due to the fact that the Darlington drive circuit is "on" and the system is operating at full capacity. If a true fault exists, the output of NAND 92 will be high and the output of NAND 64, which is coupled to the NAND 76, will go low.

In FIG. 3, three different modes of operation are shown with respect to the circuit of the invention; "Normal Operation", "No Rotation", and "Slow Rotation". Various timing diagrams are shown, with reference letters as seen in FIG. 2.

"Normal Operation" indicates that the alternator/regulator system is operating with no perceptible problems. Signals "A" and "B" are clock signals from the clock generator or oscillator 40. In this preferred embodiment, the clock generator includes a chain of flip flops including flip flops 82,84. Each of the output signals is a 50% duty cycle signal and when these two are NANDed in NAND gate 86 the result, signal "C", is a 25% duty cycle signal. While 25% has been determined to be near the optimum for this invention in the present application, it may be seen that a link 88 has been included in the path of signal "B". This link is included in the metallization of the integrated circuit chip for the purpose of providing the user a choice of 25% or 50% duty cycle.

In normal operation, the signal "D" will provide two pulses for each rotation period of the alternator. The period of the signal "D" is seen to be "$\theta$". The signals "E" and "F" are also provided by the clock generator 40, and have one pulse per regulator period "$\phi$", with "$\phi$" much greater than "$\theta$". Since the signal "D" has reset the flip flop 74 before the 25% duty cycle point, and the signal "H" indicates that no fault is present in the system, the signal "J" stays high. Thus, whatever control signal "K" is being coupled into the terminal 60A from the regulator 24 will be coupled back to the regulator via the NAND gate 90 and the terminal 60B with no change as "L". It is the signal "L" from the NAND gate 90 which will determine the current supplied to the field coil 14. Signals "K" and "L" are not shown here for the reason that their specific timing is not significant except that, under the conditions of "No Rotation", signal "L" would imitate "C"; i.e., a 25% duty cycle signal.

The next section of FIG. 3 represents the condition where the ignition switch 25 has been closed, but the engine has not been started. As before, the signals "A" and "B" produce "C", and signals "E" and "F" are supplied by the clock generator 40. The signal "D", however, which is derived from the "phase" signal at the tap 20, is conspicuously missing. Since there is no pulse in the signal "D" from differentiator 72 to reset the flip flop 74, the output signal "G" remains high, putting a high on the data input of the D-type latch 80 and keeping "H" high. Therefore, when "C" goes high, "J" goes low, reducing the flow of current to the field coil 14 to the desired 25% duty cycle.

In the "Slow Rotation" portion of FIG. 3, signals "A", "B", "C", "E" and "F" are as before. However, it will be seen that the pulses of "D" are spaced much farther apart. Lacking the signal "H" to show that the system has no fault, when the flip flop 74 is not reset due to the phase period "$\theta$" being too long, the system would shut down the excitation. With the signal "H" coupled to the NAND 78, the normal range of duty cycle is still available for controlling the regulator. This situation does not occur frequently, but can happen at heavy load, low rpm and with a regulator operating near the minimum regulate period.

Thus there has been shown and described a means of protecting an automotive battery and regulator module from possible damage due to temperature overload and excess battery drain. The system can operate with only a minimum of added components on an integrated circuit chip, and requires only a means of controlling the duty cycle of the field coil, means for establishing the operational status of the alternator, and means for detecting faults in the system. Other embodiments of this invention are possible and it is intended to cover all such as fall within the scope of the appended claims.

What is claimed is:

1. A regulator protection circuit for use with an laternator having a field coil, associated rectifiers and battery and comprising:

a regulator including a control circuit for controlling the current in the field coil of said alternator;

a source of clock signals;

first logic means coupled to said source for providing a first control signal having a predetemined duty cycle;

second logic means coupled to receive output signals from said alternator and said clock signal source for determining the operating condition of said alternator and for outputting a second control signal indicative of the presence of absence of a serious system fault;

third logic means coupled to combine the outputs signals of said first logic means and said second logic means for providng a third control signal, the third control signal having a duty cycle no greater than the duty cycle of said first control signal only when a serious fault is indicated and being coupled to said regulator for enabling said control circuit.

2. A regulator protection circuit in accordance with claim 1 and wherein the first logic means includes means for providing a choice of duty cycles.

3. A regulator protection circuit in accordance with claim 1 and wherein the second control signal indicates alternator rotation.

4. A regulator protection circuit in accordance with claim 1 and wherein the second control signal indicates the level of voltage output.

5. A regulator protection circuit in accordance with claim 1 and wherein the second logic means circuit includes means for latching the second control signal.

6. A regulator protection circuit in accordance with claim 5 and wherein the second logic means further includes means for providing an output signal indicative of the alternator rotation and the third logic means includes a gate for combining the first control signal, said output signal and the latched second control signal.

7. A regulator protection circuit in accordance with claim 6 and further including an input means from providing an input signal for said control circuit and wherein said input signal is coupled through said third logic means, and the third logic means includes a second gate for combining the third control signal and said input signal.

8. A regulator protection circuit for use with an alternator having a field coil, associated rectifiers and battery and comprising:

a regulator including a control circuit for controlling the current in the field coil of said alternator;

a source of clock signals including means for providing a control signal having a predetermined duty cycle;

first logic means coupled to receive output signals from said alternator and said clock signal source for determining the operating condition of said alternator and for providing an output signal indicative of the presence or absence of a serious system fault; and second logic means coupled to combine the output signals of said regulator, said clock source and said first logic means for providing an enabling signal for the current in said field coil of said regulator control circuit in response thereto, the enabling signal having a duty cycle no greater than the duty cycle of said first control signal only when a serious fault is indicated.

* * * * *

UNITED STATES PATENT AND TRADEMARK OFFICE
CERTIFICATE OF CORRECTION

PATENT NO. : 4,670,705

DATED : June 2, 1987

INVENTOR(S) : Kirk Alan Sievers and Arthur James Edwards

It is certified that error appears in the above-identified patent and that said Letters Patent is hereby corrected as shown below:

Col. 6, line 18, "later-nator" should be --alternator--.

Signed and Sealed this

Fifteenth Day of December, 1987

Attest:

DONALD J. QUIGG

Attesting Officer          Commissioner of Patents and Trademarks